United States Patent
Drotleff et al.

(10) Patent No.: US 11,745,711 B2
(45) Date of Patent: Sep. 5, 2023

(54) HYDRAULIC BRAKING SYSTEM FOR A VEHICLE, METHOD FOR OPERATING

(71) Applicant: Robert Bosch GmbH, Stuttgart (DE)

(72) Inventors: Dirk Drotleff, Oberstenfeld-Gronau (DE); Xun Yao, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 106 days.

(21) Appl. No.: 16/925,691

(22) Filed: Jul. 10, 2020

(65) Prior Publication Data
US 2021/0031742 A1     Feb. 4, 2021

(30) Foreign Application Priority Data
Aug. 1, 2019 (DE) .......................... 102019211537.3

(51) Int. Cl.
| | |
|---|---|
| *B60T 13/74* | (2006.01) |
| *B60T 13/68* | (2006.01) |
| *B60T 7/12* | (2006.01) |
| *B60T 13/16* | (2006.01) |
| *B60T 7/04* | (2006.01) |

(52) U.S. Cl.
CPC ............ *B60T 13/686* (2013.01); *B60T 7/042* (2013.01); *B60T 7/12* (2013.01); *B60T 13/168* (2013.01); *B60T 2270/402* (2013.01); *B60T 2270/404* (2013.01); *B60T 2270/82* (2013.01)

(58) Field of Classification Search
CPC ............ B60T 13/745; B60T 2270/402; B60T 2270/404; B60T 2270/413; B60T 2270/82
See application file for complete search history.

(56) References Cited

U.S. PATENT DOCUMENTS

| | | | | |
|---|---|---|---|---|
| 2014/0028083 | A1* | 1/2014 | Gerdes ................... | B60T 13/662 303/6.01 |
| 2017/0282877 | A1* | 10/2017 | Besier ..................... | B60T 8/885 |
| 2017/0361825 | A1* | 12/2017 | Drumm ................. | B60T 8/4081 |
| 2019/0031165 | A1* | 1/2019 | Besier ..................... | B60T 7/042 |
| 2019/0308601 | A1* | 10/2019 | Maj .......................... | B60T 7/042 |
| 2019/0344769 | A1* | 11/2019 | Zimmermann ....... | B60T 13/168 |
| 2020/0114894 | A1* | 4/2020 | Leiber .................... | B60T 17/04 |

(Continued)

FOREIGN PATENT DOCUMENTS

WO     WO-2015032637 A1 *    3/2015    ............ B60T 8/4081

OTHER PUBLICATIONS

Machine translation of WO 2015032637, retrieved May 31, 2022 (Year: 2022).*

*Primary Examiner* — Bradley T King
(74) *Attorney, Agent, or Firm* — NORTON ROSE FULBRIGHT US LLP; Gerard Messina

(57) ABSTRACT

A hydraulic braking system for a motor vehicle, including at least two brake circuits which each include at least one hydraulically actuatable wheel brake and at least one electrically operable pressure generator, the pressure generators being activatable as a function of a brake request of the motor vehicle or a driver of the motor vehicle. A respective electric actuator is assigned to each pressure generator for its operation, and at least one activatable emergency operation valve is interconnected between the brake circuits, which in a first switching position disconnects the brake circuits from one another and in a second switching position connects them to one another.

12 Claims, 2 Drawing Sheets

(56) References Cited

U.S. PATENT DOCUMENTS

| | | | |
|---|---|---|---|
| 2020/0276963 A1* | 9/2020 | Zimmermann | B60T 7/04 |
| 2020/0307538 A1* | 10/2020 | Ganzel | B60T 8/4081 |
| 2020/0339086 A1* | 10/2020 | Grimm | B60T 13/686 |
| 2021/0053540 A1* | 2/2021 | Besier | B60T 8/17 |
| 2021/0380087 A1* | 12/2021 | Di Stefano | B60T 7/042 |
| 2022/0219665 A1* | 7/2022 | Zhang | B60T 13/686 |

\* cited by examiner

HYDRAULIC BRAKING SYSTEM FOR A VEHICLE, METHOD FOR OPERATING

CROSS REFERENCE

The present application claims the benefit under 35 U.S.C. § 119 of German Patent Application No. DE 102019211537.3 filed on Aug. 1, 2019, which is expressly incorporated herein by reference in its entirety.

FIELD

The present invention relates to a hydraulic braking system for a motor vehicle, including at least two brake circuits which each include at least one hydraulically actuatable wheel brake and at least one electrically operable pressure generator, the pressure generators being activatable as a function of a brake request of the motor vehicle or a driver of the motor vehicle.

The present invention furthermore relates to a method for operating such a braking system, the pressure generators being activated as a function of a brake request of the motor vehicle or a driver of the motor vehicle.

BACKGROUND INFORMATION

Conventional braking systems are designed as hydraulic braking systems, in which a brake pedal, which may be actuated by a driver, is hydraulically connected, for example, with the aid of an interposed master brake cylinder and a brake booster, to one or multiple brake circuit(s), each including one or multiple wheel brake(s). With the increasing electrification of motor vehicles, an electrical assistance of braking systems is also increasing. It is conventional in the process to provide one or multiple pressure generator(s), in addition to the force application by the driver, which generate(s) a hydraulic pressure, when needed, in at least one of the brake circuits, in addition to or independently of a brake pedal actuation. For this purpose, a pressure generator, which is drivable by an electromotive or electromagnetic actuator, is assigned to the particular brake circuit. As a result, a so-called wireless or cordless braking action (brake by wire) is also possible. No hydraulic access by the driver to the brake circuit takes place in the process. If the brake pedal, however, is hydraulically decoupled from the particular brake circuit, the driver, for example, is no longer able to identify an error in the braking system itself based on a changed pedal sensation. In motor vehicles having a high degree of automation, in particular, with respect to the braking system, safety-relevant systems thus have to be redundantly implemented to continue to ensure the safe operation of the motor vehicle when an error occurs. In particular, it is important to be able to transfer the motor vehicle into a safe state in the event of an individual error of the braking system.

SUMMARY

An example braking system according to the present invention may have the advantage that the braking system may always be transferred into a safe state in a simple manner, in particular, without the provision of redundant hydraulic systems, when an individual error occurs. The approach in accordance with the present invention is implementable in an installation space-saving and cost-effective manner. The braking system according to the present invention includes a dedicated electric actuator assigned to each pressure generator for its operation, and at least one activatable emergency operation valve interconnected between the brake circuits, which in a first switching position disconnects the brake circuits from one another and in a second switching position connects them to one another. Normally, the pressure generators may thus generate a hydraulic pressure independently of one another in the respective assigned brake circuit. In the first switching position, the emergency operation valve is normally switched in such a way that the brake circuits are disconnected from one another. The brake circuits are connected to one another by the activation of the emergency operation valve so that, for example in the event of a failure of one pressure generator, the remaining pressure generator may be utilized for generating a hydraulic pressure in the two brake circuits. The braking system is thus transferred into a safe operating state in a simple manner.

In particular, the emergency operation valve is designed as a closed valve when de-energized, which is in the de-energized state in the first switching position. Thus, if the emergency operation valve is not activated, the brake circuits are disconnected from one another. Only when an error in the braking system is identified, in particular, with respect to a pressure generator or its assigned electric actuator, is the emergency operation valve electrically activated to connect the brake circuits to one another.

According to one preferred refinement of the present invention, the electric actuators are connected to electrical system parts of an electrical system of the motor vehicle which are disconnected or disconnectable from one another. In this way, an individual energy supply of the particular electric actuator is ensured, so that, in the event of a failure of an electrical system part, the remaining electric actuator continues to be activated and, as a result, is able to generate a hydraulic pressure in both brake circuits, by activation of the emergency operation valve.

Preferably, each of the electric actuators is connected to a respective control unit. In this way, an individual activation of the electric actuators is ensured. In particular, the control units are each assigned to an electrical system part of the electrical system, so that the control units are also supplied with energy and operated independently of one another.

For detecting a brake request of the driver, the braking system preferably includes an actuatable braking element, in particular, a brake pedal, the brake circuits being hydraulically permanently decoupled from the braking element. The present braking system is thus a mechanically/hydraulically decoupled (brake by wire) braking system, in which a hydraulic access by the driver to the brake circuits is not possible, not even as a fallback position in the event that one of the electric actuators and/or pressure generators fails. In this way, a hydraulic coupling or emergency coupling may be dispensed with, and installation space and costs may be saved during the manufacture of the braking system.

The braking system preferably includes at least one further activatable pressure generator, which is connected to one or both of the brake circuits. The further pressure generator includes, in particular, an activatable electric actuator, which is connected to one, or preferably to two, further pressure generator(s) to simultaneously drive the one or the two pressure generator(s) during its operation, in the latter case a respective pressure generator being assigned to one of the brake circuits. Due to the further pressure generator or generators, the operating variety of the braking system is increased and, for example, it is ensured that a higher hydraulic pressure is providable in a shorter time.

The pressure generators are preferably each connected on the suction side to a tank, in particular, to a shared tank, which is designed to accommodate, store and provide hydraulic medium. The pressure generators are thus advantageously supplied with a hydraulic medium from a shared tank.

Each wheel brake is preferably assigned an individually actuatable intake valve as well as an individually actuatable discharge valve, the intake valves being designed as valves open to flow. The intake valves are thus designed as passive valves, so that a braking force at the particular wheel brake is solely settable by the driving of one or multiple pressure generator(s). To focus the hydraulic pressure on an individual wheel brake, for example, so that an increased hydraulic pressure arises thereon in a shorter time, the intake valves of several of the other intake valves, for example, are closed.

The discharge valves are preferably connected to the further pressure generator on the suction side. If the further pressure generator is present, the recirculated hydraulic medium, which is released during the opening of the discharge valves, and thus during the reduction of the braking force of the particular wheel brake, is supplied to the further pressure generator on the suction side, so that this hydraulic medium is available to it again during its activation. In this regard, this is a closed braking system since, in this case, the hydraulic medium is not conducted past the pressure generators to the tank.

The brake circuit preferably includes a switching valve, with the aid of which the particular brake circuit is connectable to the associated pressure generator or disconnectable therefrom. Due to the switching valve, an individual application of a hydraulic pressure to the brake circuit is ensured, even when one of the pressure generators and/or electric actuators has failed. As a result of the emergency operation valve, the provided pressure is distributed between both brake circuits and, when needed, is limited to one of the brake circuits by the activation of one of the switching valves.

The switching valves are thus preferably connected downstream from the emergency operation valve.

An example method according to the present invention includes that each pressure generator is operated by a dedicated electric actuator, and that, during emergency operation, the brake circuits are connected to one another by the activation of an emergency operation valve which is interconnected between the brake circuits and, during normal operation, disconnects the brake circuits from one another. The emergency operation is, in particular, initiated when it is identified that a malfunction is present in the braking system, in particular, with respect to one of the electric actuators and/or pressure generators. For this purpose, the electric actuators and pressure generators of the braking system are, in particular continuously, monitored for their functional capability.

A braking force is preferably set at at least one of the wheel brakes solely by the activation of one of the electric actuators. The braking force is increased and reduced in the process by the activation of the electric actuators. The activation of the valves is dispensed with, so that a cost-effective and energy-efficient operation of the braking system is ensured.

The braking force at at least one of the wheel brakes is alternatively preferably set by the activation of at least one intake valve assigned to one of the wheel brakes. If, for example, an increased braking force is requested at one wheel brake, the intake valves of the other wheel brakes are preferably closed, so that the provided hydraulic pressure acts only on the one wheel brake. In particular, the intake valves are activated in the process in such a way that a desired hydraulic pressure is applied to all wheel brakes of the braking system, the hydraulic pressure being set in a wheel brake-specific manner to ensure a high driving stability of the motor vehicle with maximal braking power.

Example embodiments of the present invention are described in greater detail hereafter based on the figures.

DETAILED DESCRIPTION OF EXAMPLE EMBODIMENTS

Figure 1:
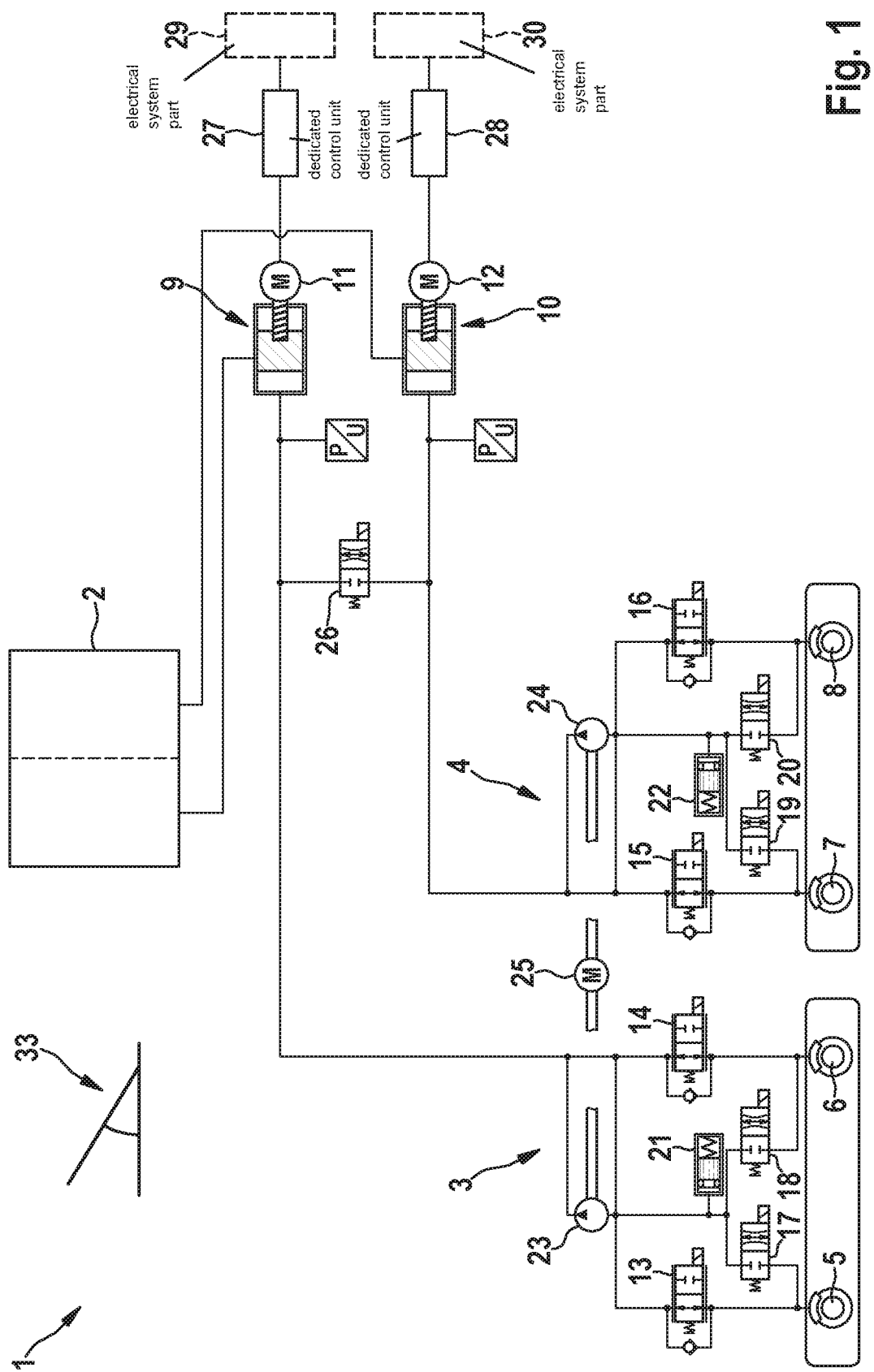
FIG. 1 shows a first exemplary embodiment of an advantageous braking system for a motor vehicle.

FIG. 1 shows, in a simplified illustration, a first exemplary embodiment of an advantageous braking system 1 of a motor vehicle which is not shown in greater detail here. Braking system 1 includes an, in particular fillable, tank 2, which stores and provides a hydraulic medium, in particular, brake fluid, for braking system 1. The tank is hydraulically connected to two brake circuits 3 and 4. Optionally, a dedicated tank 2 is present for each of brake circuits 3, 4, as is indicated by a dotted line in tank 2.

According to the present exemplary embodiment, each brake circuit 3, 4 includes two wheel brakes 5, 6 and 7, 8, which are each designed to be hydraulically actuatable as friction brakes. According to the present exemplary embodiment, wheel brake 5 is assigned to the right wheel of a front wheel axle, wheel brake 6 is assigned to the left wheel of a rear wheel axle, wheel brake 7 is assigned to the left wheel of the front wheel axle, and wheel brake 8 is assigned to the right wheel of the rear wheel axle of the motor vehicle including four wheels and two axles.

Each brake circuit includes a pressure generator 9, 10, which is designed to generate a hydraulic pressure in the particular brake circuit 3, 4. For this purpose, pressure generators 9, 10 are connected to the respective brake circuit 3, 4 on the pressure side, and to tank 2 on the suction side. Each of pressure generators 9, 10 is assigned a respective electric actuator 11 and 12. According to the present exemplary embodiment, electric actuators 11, 12 are designed as electric motors, and pressure generators 9, 10 are designed as piston pumps. Optionally, pressure generators 9, 10 may also be configured as rotary pumps or the like. Electromagnetic actuators are also possible as electric actuators 11, 12.

The respective pressure generator 9, 10 is hydraulically connected on the pressure side to wheel brakes 5, 6 and 7, 8 of the associated brake circuit 3, 4. A respective intake valve 13, 14, 15, 16 is assigned to wheel brakes 5, 6, 7, 8, which is designed as an open valve when de-energized, with the aid of which, in the de-energized state, the respective pressure generator 9, 10 is directly connected on the input side to the assigned wheel brakes 5, 6, 7, 8. In addition, an activatable discharge valve 17, 18, 19, 20, which is designed in each case as a closed valve when de-energized, is assigned to each wheel brake 5 through 8. According to the present exemplary embodiment, discharge valves 17 through 20 are connected on the discharge side to a pressure accumulator 21 or 22 of the respective brake circuit 3, 4, as well as optionally, on the suction side, to a further pressure generator 23, 24 of the respective brake circuit 3, 4. Pressure generators 23, 24, in turn, are connected on the pressure side to intake valves 13, 14 or 15, 16. A shared electric actuator 25, in the present example in the form of an electric motor, is assigned to further pressure generators 23, 24, which drives both pressure generators 23, 24, in particular, hydraulic pumps, when needed. Hydraulic medium may be intermediately stored in the respective pressure accumulator 21, 22, so that pressure fluctuations may be avoided, and hydraulic medium may always be provided for pressure generators 23, 24.

The two brake circuits 3, 4 are hydraulically couplable to one another by an emergency operation valve 26 downstream from pressure generators 9, 10 and upstream from intake valves 13 through 16 as well as from the optional pressure generators 23, 24. Emergency operation valve 26 is electrically activatable and designed in such a way that it is closed in a de-energized or non-activated switching position, so that brake circuits 3, 4 are disconnected from one another. By electrical activation, emergency operation valve 26 may be moved from the first switching position into a second switching position, in which brake circuits 3, 4 are hydraulically connected to one another by emergency operation valve 26.

The advantageous design of braking system 1 results in the advantage that, if one of pressure generators 9, 10 or the associated electric actuator 11, 12 should fail due to a malfunction, a hydraulic pressure may nonetheless be generated by the remaining pressure generator 10, 9 and be provided to both brake circuits 3, 4 by activation of emergency operation valve 26, so that a braking force is settable at all wheel brakes 5 through 8 of braking system 1. In this way, a safe vehicle state of the motor vehicle is ensured at all times, even if one of pressure generators 9, 10 or the associated electric actuator 11, 12 should fail. If, for example, pressure generator 9 fails, emergency operation valve 26 is opened or transferred into the second switching state, so that the pressure provided by pressure generator 10 is distributed between both brake circuits 3, 4.

To further increase the reliability against failure, electric actuators 11, 12 are each connected to a dedicated control unit 27 and 28, so that the electric actuators are operable independently of one another. In particular, control units 27, 28 are each connected or connectable to an electrical system part 29 and 30 of an electrical system, which is not shown here, of the motor vehicle, so that the energy supply of electric actuators 11, 12 is also independent of each other. If one electrical system part 29, 30 fails, or one of control units 27, 28, the continued operation of wheel brakes 5 through 8 continues to be ensured by the advantageous emergency operation valve 26.

The above-described exemplary embodiment is a closed braking system, in which additionally a high variability in the setting of a desired hydraulic pressure is ensured by the activation of the further pressure generators 23, 24. Due to the design of intake valves 13 through 16 as open intake valves when de-energized, it is ensured that the hydraulic pressure at the wheel brakes, and thus the braking force of wheel brakes 5 through 8, is regulatable solely by the activation of pressure generators 9, 10. In addition, by closing one or multiple intake valve(s), the provided hydraulic pressure of pressure generators 9, 10 may be focused on selected wheel brakes whose intake valves remain open.

Figure 2:
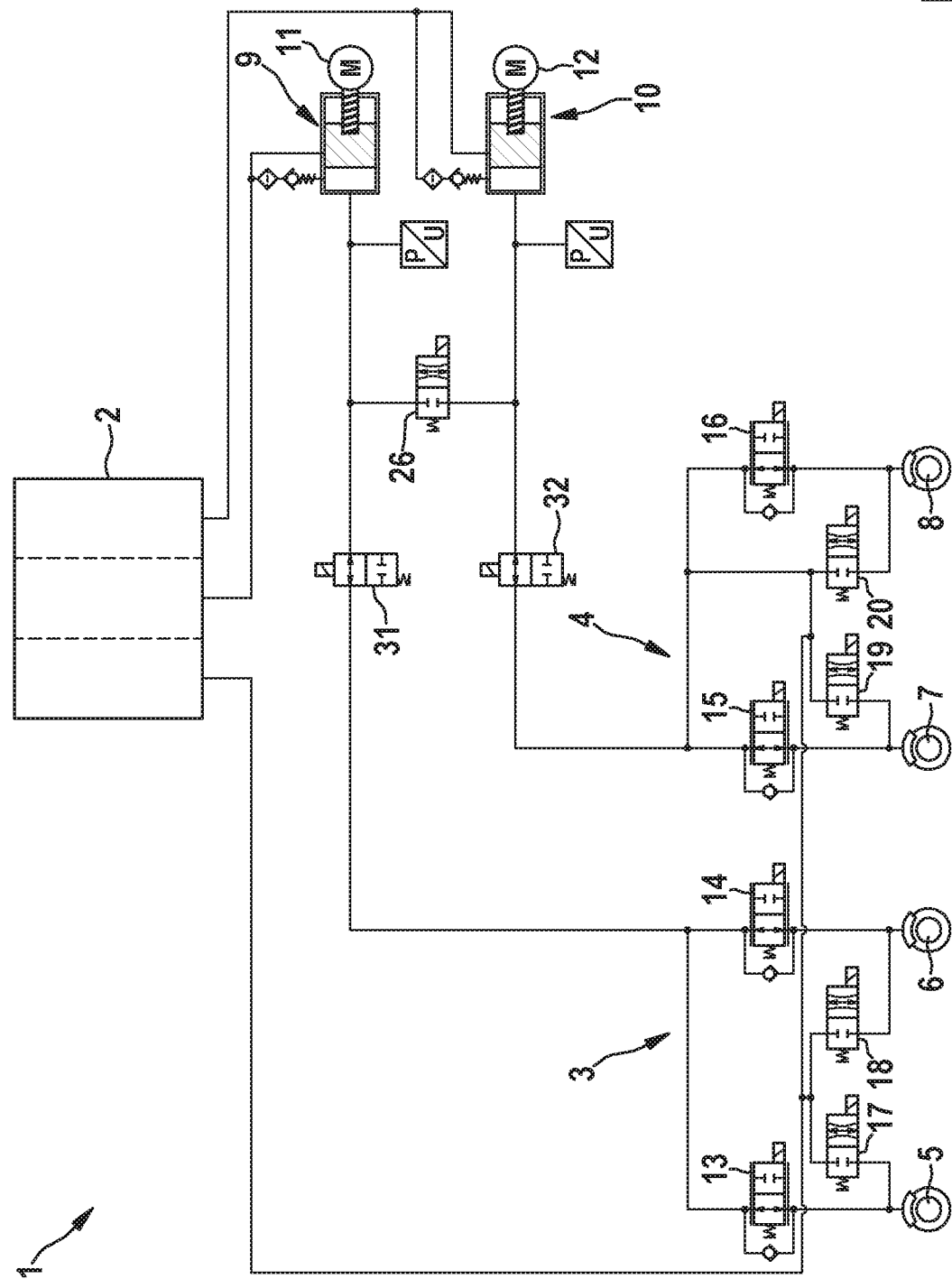
FIG. 2 shows a second exemplary embodiment of the braking system, each in a simplified illustration.

FIG. 2 shows a further exemplary embodiment of braking system 1, elements shown FIG. 1 being denoted by the same reference numerals. Hereafter, essentially only the differences shall be addressed.

In contrast to the preceding exemplary embodiment of the present invention, in accordance with another example embodiment of the present invention, braking system 1 is now designed as an open braking system, in which discharge valves 17 through 20 are each directly connected on the discharge side to tank 2, so that outflowing hydraulic medium is directly recirculated to tank 2. According to this exemplary embodiment, furthermore the additional pressure generators 23, 24 and electric actuator 25 are optionally dispensed with.

According to the present exemplary embodiment, it is furthermore provided that a respective electrically activatable switching valve 31 and 32, which in each case is open when de-energized, is switched in the respective switching circuit 3, 4 downstream from emergency operation valve 26. The connection of pressure generators 9, 10 to brake circuits 3, 4 is interrupted by the activation of switching valves 31, 32. In this way, it is possible during emergency operation, after opening of emergency operation valve 26, to focus the pressure provided by the remaining pressure generator on one of brake circuits 3, 4 by the activation of one of switching valves 31, 32 if, for example, an increased braking force is needed at the front wheel axle or at the rear wheel axle. While in the present example brake circuits 3, 4 provide an X division, it is also conceivable to configure a parallel or II division of brake circuits 3, 4, in which the one brake circuit 3 includes wheel brakes 5, 7 of the front wheel axle, and the other brake circuit 4 includes wheel brakes 6, 8 of the rear wheel axle. In particular, an axle-specific pressure application of the wheel brakes, as was already described above, is made possible.

During normal operation, pressure generators 9, 10 thus act in each case on only one brake circuit 3, 4, but may also act on all four wheel brakes 5 through 8 by the activation of emergency operation valve 26. In this way, it also continues to be possible to brake all four wheels of the motor vehicle in the event a pressure generator 9, 10 fails. In particular, braking system 1 is designed in such a way that emergency operation valve 26 is activatable independently by both control units 27, 28, so that an electrically redundant activation of emergency operation valve 26 is ensured here. In the event that one of control units 27, 28 or one of electrical system parts 29, 30 fails, an actuation of emergency operation valve 26 thus also continues to be ensured.

In the present exemplary embodiments, braking system 1 is designed in each case as a brake by wire system, in which pressure generators 9, 10 and brake circuits 3, 4 are hydraulically decoupled from a brake pedal 33 actuatable by a driver. Control units 27, 28 are preferably coupled to brake pedal 33 in such a way that they continuously monitor a brake pedal position to activate pressure generators 9, 10 for setting a desired braking torque at wheel brakes 5 through 8 as a function of detected brake pedal positions.

What is claimed is:

1. A hydraulic braking system for a motor vehicle, comprising:
 two brake circuits, each of the brake circuits including at least one hydraulically actuatable wheel brake and a respective electrically operable pressure generator, the respective electrically operable pressure generators being activatable as a function of a brake request of the motor vehicle or a driver of the motor vehicle, wherein each of the two brake circuits includes a respective further activatable pressure generator, the respective further activatable pressure generators being hydraulic pumps and being driven by a shared electric motor;
 an actuatable braking element configured to detect a brake request of the driver, and the brake circuits are permanently hydraulically decoupled from the braking element;

wherein a respective electric motor is assigned to each electrically operable pressure generator of the respective electrically operable pressure generators for operation of the electrically operable pressure generator, and at least one activatable emergency operation valve is interconnected between the brake circuits, the emergency operation valve, in a first switching position, disconnects the brake circuits from one another, and in a second switching position, connects the brake circuits to one another;

wherein the braking system is configured to electrically activate the emergency operation valve to connect the brake circuits to one another only during emergency operation of the braking system;

wherein the two brake circuits are separate and independent of one another except during the emergency operation of the braking system when the brake circuits are connected to each other by the emergency operation valve; and wherein the braking system includes only a total of three motors for driving all motor-driven pressure generators of the braking system, the three motors including the respective electric motors and the shared electric motor, and the motor-driven pressure generators including the respective electrically operated pressure generators and the respective further activatable pressure generators.

2. The braking system as recited in claim 1, wherein the emergency operation valve is configured as a closed emergency operation valve when de-energized, which is in the de-energized state in the first switching position.

3. The braking system as recited in claim 1, wherein energy supplies of the electric motors are independent of one another.

4. The braking system as recited in claim 1, wherein each electric motor is connected to a respective control unit.

5. The braking system as recited in claim 1, wherein the actuatable braking element is a brake pedal.

6. The braking system as recited in claim 1, wherein the respective electrically operable pressure generators are connected on a suction side of the respective electrically operable pressure generators to a shared tank which is configured to accommodate, to store and provide hydraulic medium.

7. The braking system as recited in claim 1, wherein an individually actuatable intake valve and an individually actuatable discharge valve are assigned to each of the wheel brakes, the intake valves being configured as open valves when de-energized.

8. The braking system as recited in claim 7, wherein each of the discharge valves are hydraulically connected to a suction side of one of the respective further pressure generators.

9. A method for operating a braking system of a motor vehicle, the braking system including two brake circuits, each of the brake circuits including at least one hydraulically actuatable wheel brake and a respective electrically operable pressure generator, the respective electrically operable pressure generators being activated as a function of a brake request of the motor vehicle or a driver of the motor vehicle, the method comprising:

operating each of the respective electrically operable pressure generators by a respective electric motor; and activating, for an emergency operation, an emergency operating valve to connect the brake circuits to one another for the emergency operation, the emergency operating valve disconnecting the brake circuits from one another during normal operation;

wherein each of the two brake circuits includes a respective further activatable pressure generator, the respective further activatable pressure generators being hydraulic pumps and being driven by a shared electric motor;

wherein the braking system includes an actuatable braking element configured to detect a brake request of the driver, and the brake circuits are permanently hydraulically decoupled from the braking element;

wherein the emergency operating valve is activated to connect the brake circuits to one another only for the emergency operation;

wherein the two brake circuits are separate and independent of one another except during the emergency operation of the braking system when the brake circuits are connected to each other by the emergency operation valve; and wherein the braking system includes only a total of three motors for driving all motor-driven pressure generators of the braking system, the three motors including the respective electric motors and the shared electric motor, and the motor-driven pressure generators including the respective electrically operated pressure generators and the respective further activatable pressure generators.

10. The method as recited in claim 9, wherein a braking force at at least one of the wheel brakes is set solely by the activation of one of the electric motors.

11. The method as recited in claim 9, wherein a braking force at at least one of the wheel brakes is set by an activation of at least one intake valve assigned to one of the wheel brakes.

12. The method as recited in claim 9, wherein the actuatable braking element is a brake pedal.

* * * * *